C. T. WATSON.
Stave Sawing Machine.
No. 111,414.
Patented Jan'y 31, 1871.
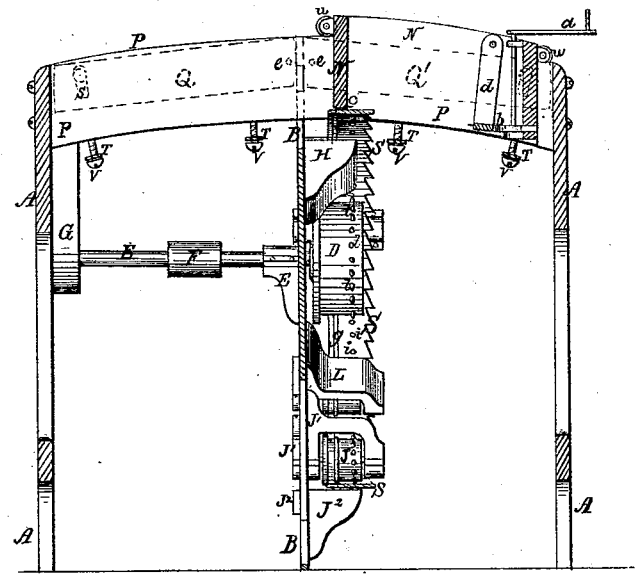
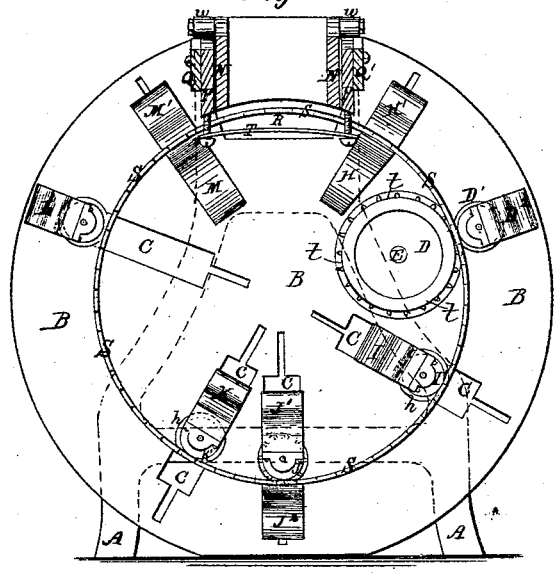
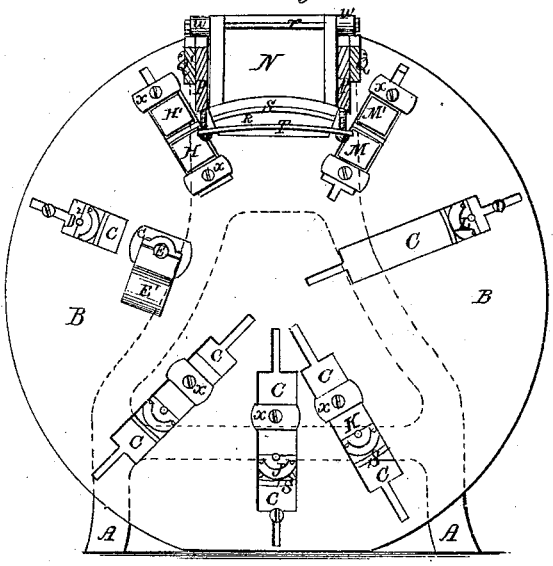
Witnesses
William W. Deane
Chas. F. Ransbury
Inventor
Chas. T. Watson

United States Patent Office.

CHARLES THOMPSON WATSON, OF DEERFIELD, MICHIGAN.

Letters Patent No. 111,414, dated January 31, 1871.

---

IMPROVEMENT IN STAVE-SAWING MACHINES.

The Schedule referred to in these Letters Patent and making part of the same.

*To all whom it may concern:*

Be it known that I, CHARLES THOMPSON WATSON, of Deerfield, in the county of Lenawee and State of Michigan, have invented certain new and useful Improvements in Stave-sawing Machines; and I do hereby declare the following to be a full and correct description of the same, reference being had to the accompanying drawing, in which—

Figure 1 is a vertical central longitudinal section of the machine.

Figure 2 is a transverse vertical section, looking toward the rear of the machine; and Figure 3 is a similar section, looking toward the front of the machine.

The same letter indicates the same part in all the figures.

The nature of this invention consists in the peculiar method of hanging, supporting, guiding, and driving the saw, all as hereinafter more particularly set forth.

To enable others to make and use my machine, I will proceed to describe its construction and operation.

A stout frame, A, supports parallel curved ways, P, on which the carriage N, carrying the block from which the staves are to be cut, is to traverse.

Firmly attached to these ways, and depending transversely from them, is the large disk B, circular in general outline, to which the saw-guiding and operating mechanism is attached.

This disk is perforated with radial slots, C C, &c., in which the saw-guides and driving mechanism are received and adjusted.

The saw S is a hoop-saw, having teeth on its front edge, as shown. It is perforated throughout its length with holes, $i\ i$, which receive pins or teeth, $t\ t$, projecting from the periphery of the driving-wheel D.

This wheel is fixed to the front end of the shaft E, on which is pulley F, to which a driving-belt from a suitable drum, imparts the requisite motion.

The rear end of shaft E works in an adjustable journal-box (not shown) supported by the pendent bracket G.

The forward portion of shaft E turns in an adjustable journal-box, E', clamped to the disk B, as shown in figs. 1 and 3. The object of this adjustability of the journal-boxes is to adapt the driving-wheel to saws of different diameters. The same reason applies to all the supports and guides of the saw.

These are all held to the disk by metallic clamps, $x\ x$, &c., controlled by screws passing through the slots C in the disk B, as clearly shown in fig. 3.

By loosening the screws the clamps are released, and any desired adjustment of the parts can be made and fixed.

The saw has a groove, $g$, throughout its length, which receives a tongue, $h$, projecting from the periphery of the rollers I' K'. This arrangement prevents lateral vibration of the saw.

As a further or alternative means of preventing lateral motion, I place near the bottom of the saw a loose pinion or roller, J, having teeth in its periphery, which enter the slots $i\ i$ in the saw-blade.

Unsteadiness of motion is the principal evil to be apprehended in the use of the hoop-saw. When run between ordinary friction-rollers, it is apt to take on a a violent lateral vibration at that part of the circle opposite to that at which the work is being performed, causing great friction and strain, and marring the quality of the work from a portion of the vibratory action necessarily extending to that part of the saw engaged in work. The surfaces of the friction-rollers soon wear away in an uneven manner, and their journals, owing to the high speed, heat and give way, necessitating constant expense and stoppage for repairs. I propose to substitute for the ordinary friction-rollers fixed adjustable bearings or lugs, represented in the drawing by H H' M M', placed on both sides of the saw, which runs in contact with and between them. These bearings I prefer to make of glass, but may make them of steel or other metal, or with a surface of properly-polished raw-hide. These lugs are clamped and adjusted to the disk B in the manner before described.

L marks the bracket of an ordinary friction-roller bearing on the outside of the saw.

I and K are, respectively, the brackets of the rollers I' and K', having tongues, $h\ h$, entering the groove $g$ on the inside of the saw.

The upper part of the frame consists of the curved ways P, which have the ordinary curve of a stave, and support the carriage N, in which the block to be sawed rests.

The block is held between teeth, $c$, at one end of the carriage, and a pendulous dog, $d$, suspended at the other end, and controlled by a horizontal cam, $b$, operated by the crank $a$, to throw the dog forward, or allow it to swing backward, as desired.

The carriage is an oblong box, of suitable dimensions, without top or bottom, and provided at its corners with wheels or rollers, $w\ w$, which rest upon and traverse the ways P.

When the block or bolt is placed in the carriage, its lower surface rests upon the cross-supports T, which are attached, by adjustable screw-bolts, $v\ v$, to the lower side of the ways P. The vertical distance between the upper sides of these supports and the inner surface of the saw is the gauge of the thickness of the stave, and can be regulated at will by means of the screw-bolts $v\ v$. The curvature of the supporting-bars T should correspond with that of the saw, in order to give a firm and even bearing to the bottom of the bolt.

The curved ways are intended for use on staves which require to be curved from end to end. But it is sometimes desired to cut straight staves, and for that purpose I have attached on the sides of the curved ways P, by the pivots $e\ e$, the slotted arms Q Q', the outer ends of which can be raised up when required, so as to form a straight way upon which the carriage N will traverse in a horizontal line. This will produce a stave which is the segment of a true cylinder.

The operation of the machine has necessarily been inferred from the description of its construction, and needs no further elucidation.

What I claim, and desire to secure by Letters Patent, is—

1. The combination and arrangement of the grooved and perforated saw S, adjustable fixed guides H H' M M', adjustable driving-wheel D, tongued rollers I' K', and loose pulley J, substantially in the manner specified.

2. The groove $g$ in the interior surface of the hoop-saw, in combination with one or more rollers I' K', having tongues to run in said groove, in the manner and for the purpose stated.

The above specification of my said invention signed and witnessed at Washington this 26th day of March, A. D. 1870.

CHARLES THOMPSON WATSON.

Witnesses:
WILLIAM W. DEANE,
CHAS. F. STANSBURY.